US011243418B2

(12) United States Patent
McGeehan

(10) Patent No.: US 11,243,418 B2
(45) Date of Patent: Feb. 8, 2022

(54) RF FREQUENCY TUNING IN SILICON PHOTOCONDUCTIVE-SWITCH-BASED HIGH POWER MICROWAVE SYSTEMS

(71) Applicant: BAE SYSTEMS Information and Electronic Systems Integration Inc., Nashua, NH (US)

(72) Inventor: John E. McGeehan, Manchester, NH (US)

(73) Assignee: BAE Systems Information and Electronic Systems Integration Inc., Nashua, NH (US)

(*) Notice: Subject to any disclaimer, the term of this patent is extended or adjusted under 35 U.S.C. 154(b) by 140 days.

(21) Appl. No.: 16/542,676

(22) Filed: Aug. 16, 2019

(65) Prior Publication Data

US 2021/0048694 A1 Feb. 18, 2021

(51) Int. Cl.
*G02F 1/03* (2006.01)

(52) U.S. Cl.
CPC .................. *G02F 1/0344* (2013.01)

(58) Field of Classification Search
CPC .......... G02F 1/03; G02F 1/0344; G02F 1/035; G02F 1/0533; H01Q 3/26; H01Q 3/2676; H01Q 3/2682; H01L 31/09; H01L 31/0304; H01L 31/08; H01L 31/03044

USPC ....... 359/278, 245, 264, 279, 282, 315, 320; 250/214.1, 214 LS, 214 SW, 551
See application file for complete search history.

(56) References Cited

U.S. PATENT DOCUMENTS 10,158,172 B2    12/2018 McGeehan et al.
2016/0126628 A1*  5/2016 McGeehan .......... H01Q 3/2682
                                                342/14

OTHER PUBLICATIONS

Stoudt et al., "Bistable Photoconductive Switches Particularly Suited for Frequency-AGD,E, Radio-Frequency Sourcfs", United States Statutory Invention Registration, H1717, Apr. 7, 1998 (Year: 1998).*

* cited by examiner

*Primary Examiner* — Jie Lei
(74) *Attorney, Agent, or Firm* — Maine Cernota & Rardin; Scott J. Asmus

(57) ABSTRACT

An RF frequency tuning-in-silicon photoconductive-switch-based high power microwave system including a cradle; a transmission line proximate the cradle; a photosensitive silicon material switch component also proximate the cradle; a laser light source having a varied illumination incidence location on the photosensitive material; and a laser alignment component providing the location of the illumination incidence location on the photosensitive material; whereby the inductance of the switch varies as a function of the incidence location of the illumination on the photosensitive material.

20 Claims, 11 Drawing Sheets

"LOW INDUCTANCE" STANDARD OPERATION
- MAXIMIZES FREQUENCY

INTRODUCE ADDITIONAL INDUCTANCE
- PULLS DOWN FREQUENCY OF OPERATION

1000 MHZ DESIGN
MODELING RESULTS FOR PULSE VS. INDUCTANCE 40 pH

1000 MHZ DESIGN
MODELING RESULTS FOR PULSE VS. INDUCTANCE 80 pH

1000 MHZ DESIGN
MODELING RESULTS FOR PULSE VS. INDUCTANCE 120 pH

1000 MHZ DESIGN
MODELING RESULTS FOR PULSE VS. INDUCTANCE 200 pH

1000 MHZ DESIGN
MODELING RESULTS PEAK FREQUENCY VS. L

800

1000 MHZ DESIGN AT 40 pH
MODELING RESULTS PEAK POWER VS. L

1000 MHZ DESIGN
EXPERIMENTAL RESULTS
~1 GHz CENTER OF ENERGY SPECTRUM

1000

FREQUENCY SPECTRUM VS. INDUCED PARASITIC INDUCTANCE

1000 MHZ DESIGN
EXPERIMENTAL RESULTS
~0.8 GHz CENTER OF ENERGY SPECTRUM

FLOW CHART

RF FREQUENCY TUNING IN SILICON PHOTOCONDUCTIVE-SWITCH-BASED HIGH POWER MICROWAVE SYSTEMS

FIELD OF THE DISCLOSURE

This disclosure relates to tunable RF switches, and, more particularly, to tunable photoconductive high power microwave switches.

BACKGROUND

Silicon photoconductive switches are an inexpensive, low-loss, and high-power option for use in modular, laser-triggered, high power microwave systems. However, unlike more lossy switches such as GaN, the silicon modules tend to be fixed-frequency, based on the parameters of the module.

While it may be possible to use ferroelectric or other tunable dielectric materials to change the electrical properties of a transformer/transmission line itself, rather than changing the switch, these materials require a large and constant current—often many amperes—to effect even a small change in dielectric properties, meaning that the thermal load is very high (close to being able to burn people, damage equipment, or melt the dielectric) yet the tuning is minimal. These specialty dielectrics are also often higher-loss and of lower dielectric strength, thus significantly reducing their utility as a microwave generator. What is needed, therefore, is a device, system and method for photoconductive switch frequency tuning.

SUMMARY

An embodiment provides a location-tuned radio frequency switch device comprising a transmission line; a photosensitive material switch component; and a light source having a varied illumination incidence location with respect to the transmission line; a variable area of inductance comprising a cross-sectional area between the location of the illumination incidence on the photosensitive material switch component and the transmission line; whereby an inductance of the location-tuned radio frequency switch varies as a function of the incidence location of the illumination on the photosensitive material with respect to the transmission line. In embodiments, the device comprises a cradle; and the light source comprises a laser. In other embodiments, the location-tuned radio frequency switch is a high-power microwave switch. In subsequent embodiments the photosensitive material comprises GaN. For additional embodiments the photosensitive material comprises silicon. In another embodiment, the variable area of inductance is delimited by varying the location of the illumination incidence on the photosensitive material switch component. For a following embodiment, the variable area of inductance is delimited by varying a location of the light source and the photosensitive material switch component with respect to a fixed location of the transmission line. In subsequent embodiments the variable area of inductance is delimited by varying a location of the transmission line with respect to a fixed location of the light source and the photosensitive material switch component. In additional embodiments the variable area of inductance comprises a flexible integration between the photosensitive material switch component and the transmission line. In included embodiments the variable area of inductance comprises a flexible integration between the photosensitive material switch component and the transmission line comprising foil. In yet further embodiments the illumination incidence location varies continuously. In related embodiments the incidence location of illumination of the light source comprises at least one mirror whereby the illumination is reflected to locations having varied distances from the transmission line. For further embodiments the incidence location of illumination of the light source comprises at least one stepper motor whereby the illumination is reflected to locations having varied distances from the transmission line. In ensuing embodiments the light source comprises a laser having a wavelength of about 1064 nm.

Another embodiment provides a method of frequency-tuning an RF switch comprising providing a location-tuned radio frequency switch device comprising a transmission line; a photosensitive material switch component; and a light source having a varied illumination incidence location with respect to the transition line; and a variable area of inductance comprising a cross-sectional area between the location of the illumination incidence on the photosensitive material switch component and the transmission line; whereby an inductance of the location-tuned radio frequency switch varies as a function of the incidence location of the illumination on the photosensitive material with respect to the transmission line; selecting a frequency; and directing the illumination incidence location of the light source to a location corresponding to an inductance corresponding to the selected frequency. For yet further embodiments, the step of directing the illumination incidence location with respect to the transition line comprises discrete incremental stops. For more embodiments, the step of directing the illumination incidence location with respect to the transition line comprises four discrete incremental stops. Continued embodiments include the step of directing the illumination incidence location with respect to the transition line comprises four discrete incremental stops corresponding to inductance values of about 40 pH, about 80 pH, about 120 pH, and about 200 pH. For additional embodiments, the step of directing illumination incidence location comprises varying the location of the illumination incidence on the photosensitive material switch component.

A yet further embodiment provides a high-power microwave RF frequency tuning-in-silicon photoconductive-switch-based high power microwave system comprising a cradle; a transmission line proximate the cradle; a photosensitive GaN material switch component proximate the cradle; a laser light source having a varied illumination incidence location on the photosensitive material; a variable area of inductance comprising a cross-sectional area between the location of the illumination incidence on the photosensitive material switch component and the transmission line; and a laser alignment component providing the location of the illumination incidence location on the photosensitive material; whereby an inductance of the switch varies as a function of the incidence location of the illumination on the photosensitive material.

Figure 1:
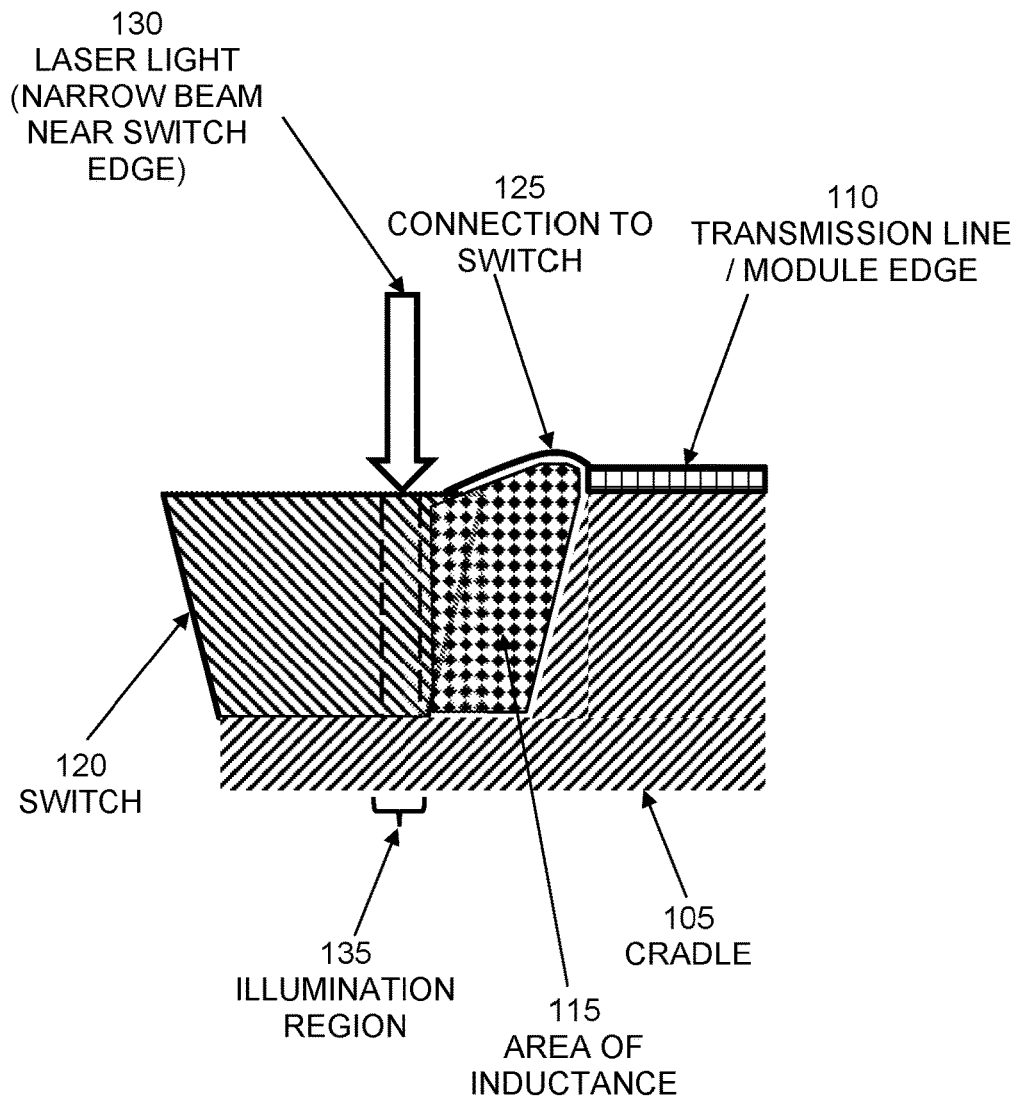
FIG. 1 depicts a low-inductance photoconductive switch configured in accordance with an embodiment.

These and other features of the present embodiments will be understood better by reading the following detailed description, taken together with the figures herein described. The accompanying drawings are not intended to be drawn to scale. For purposes of clarity, not every component may be labeled in every drawing.

DETAILED DESCRIPTION

The features and advantages described herein are not all-inclusive and, in particular, many additional features and advantages will be apparent to one of ordinary skill in the art in view of the drawings, specification, and claims. Moreover, it should be noted that the language used in the specification has been selected principally for readability and instructional purposes, and not to limit in any way the scope of the inventive subject matter. The invention is susceptible of many embodiments. What follows is illustrative, but not exhaustive, of the scope of the invention.

Embodiments provide frequency tuning within a switch module, allowing the application of a single module design to multiple target vulnerabilities, while also being applicable to GaN and other tunable switch designs. Higher-frequency module embodiments minimize the integration inductance, as the frequency of operation is highest when inductance is a minimum. By artificially introducing additional inductance—in embodiments by having a small number of possible laser/ferrule positions via a small motor, or moving the switch itself farther away from the transmission line, inductance is introduced. This introduced inductance increases the system time constant, and pulls the frequency down. While there can be a cost in peak power (same energy stored present in a wider pulse lowers the power), in embodiments, the overall efficiency remains the same, therefore thermal loading does not have to be altered. In addition, many other technologies show a tradeoff between peak power and frequency when tuned. This is not a disadvantage as much as a reality—but can be done by just moving a beam. In embodiments, modules comprise transmission lines, impedance transformers, and pulse forming networks in one module component.

Embodiments require only moving the laser or switch to create additional inductance. Alternate methods do so as well, such as holding the laser and switch static, but moving the transformer farther from the static laser and switch, or placing the switch and laser in a movable structure and moving them farther from the static transformer. Such embodiments would require a flexible (such as a foil) integration between the switch and transformer.

Embodiments can be applied to gallium nitride (GaN) high power microwave modules, to further enhance the tunability and flexibility of those devices. While already tunable, the combination of the inductance variance and laser tuning add additional capability to the system. An example of such high power microwave modules is taught in U.S. Pat. No. 10,158,172, High-Power Microwave Beam Steerable Array And Related Methods, granted Dec. 18, 2018, the contents of which is hereby incorporated in its entirety for all purposes. Further embodiments comprise silicon carbide.

FIG. 1 depicts a low-inductance photoconductive switch 100. Cradle 105 supports transmission line/module edge 110, area of inductance 115, and switch 120. Connection to switch 125 bridges transmission line/module edge 110, and switch 120. Illumination source 130, in embodiments, is a laser light with a narrow beam near the switch edge, producing illumination region 135. Area of inductance 115 depicts a cross-section area corresponding to the volume of inductance when combined with the perpendicular dimension (into the page in the Figure) of switch 120.

In this embodiment, area of inductance 115 is a comparative minimum, with illumination region 135 a minimum distance from transmission line/module edge 110.

Figure 2:
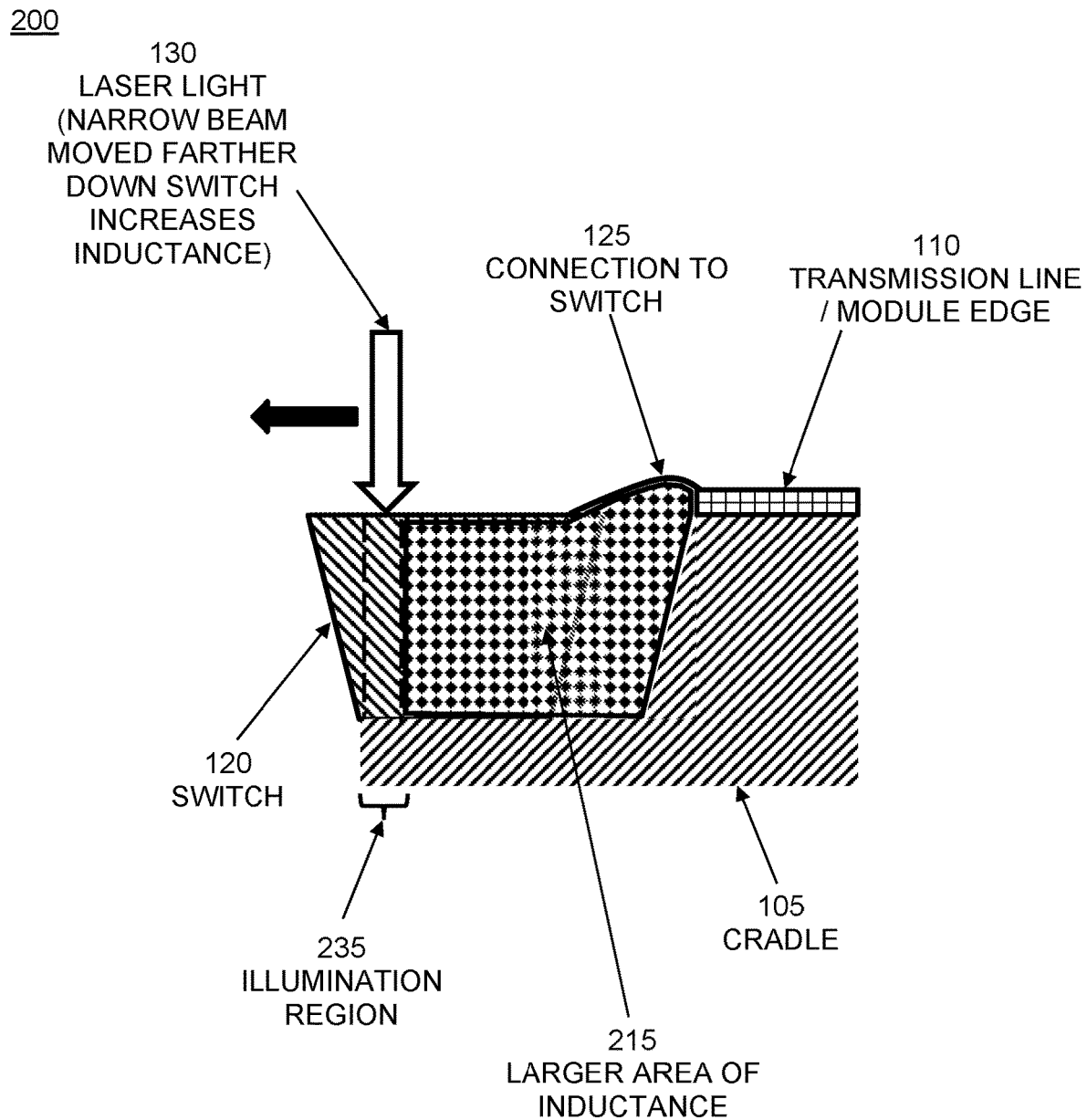
FIG. 2 depicts a higher-inductance photoconductive switch configured in accordance with an embodiment.

FIG. 2 depicts a higher-inductance photoconductive switch 200. Similar to FIG. 1, cradle 105 supports transmission line/module edge 110, area of inductance 215, and switch 120. Connection to switch 125 bridges transmission line/module edge 110, and switch 120. Illumination source 130, in embodiments, is a laser light with a narrow beam, here a maximum distance from the switch edge, producing illumination region 235.

In this embodiment, area of inductance 215 is a comparative maximum, with illumination region 235 a maximum distance from transmission line/module edge 110.

In embodiments, light source 130 is a laser. In other embodiments, switch 120 is moved farther away from the transformer. In embodiments, light source 130 is directed to discrete locations between transmission line/module edge 110, and the maximum distance from the switch edge, at illumination region 235. In other embodiments, light source 130 is directed to continuous locations between transmission line/module edge 110, and the maximum distance from the switch edge, at illumination region 235. Nonlimiting mechanism embodiment examples for directing the light source comprise one or more mirrors and one or more stepping motors. Examples employing discrete locations comprise four locations corresponding to inductance values of about 40 pH, about 80 pH, about 120 pH, and about 200 pH. Other embodiments comprise a rotator attached to the laser aperture.

While inductance was previously considered undesirable, in embodiments it can be taken advantage of to tune the output frequency. While silicon normally cannot be easily tuned, embodiments provide a degree of tunability that that creates module flexibility.

TABLE 1 depicts frequency and inductance values for a 400 MHz at 40 pH embodiment.

| f (MHz) | L (pH) |
|---|---|
| 398 | 40 |
| 355 | 80 |
| 315 | 120 |
| 239 | 200 |

TABLE 2 depicts frequency and inductance values for an 1100 MHz at 40 pH embodiment.

| f (MHz) | L (pH) |
|---|---|
| 1100 | 40 |
| 900 | 80 |
| 750 | 120 |
| 600 | 200 |

TABLE 3 depicts frequency and inductance values for a 1400 MHz at 40 pH embodiment.

| f (MHz) | L (pH) |
|---|---|
| 1395 | 40 |
| 1080 | 80 |
| 910 | 120 |
| 720 | 200 |

Figure 3:
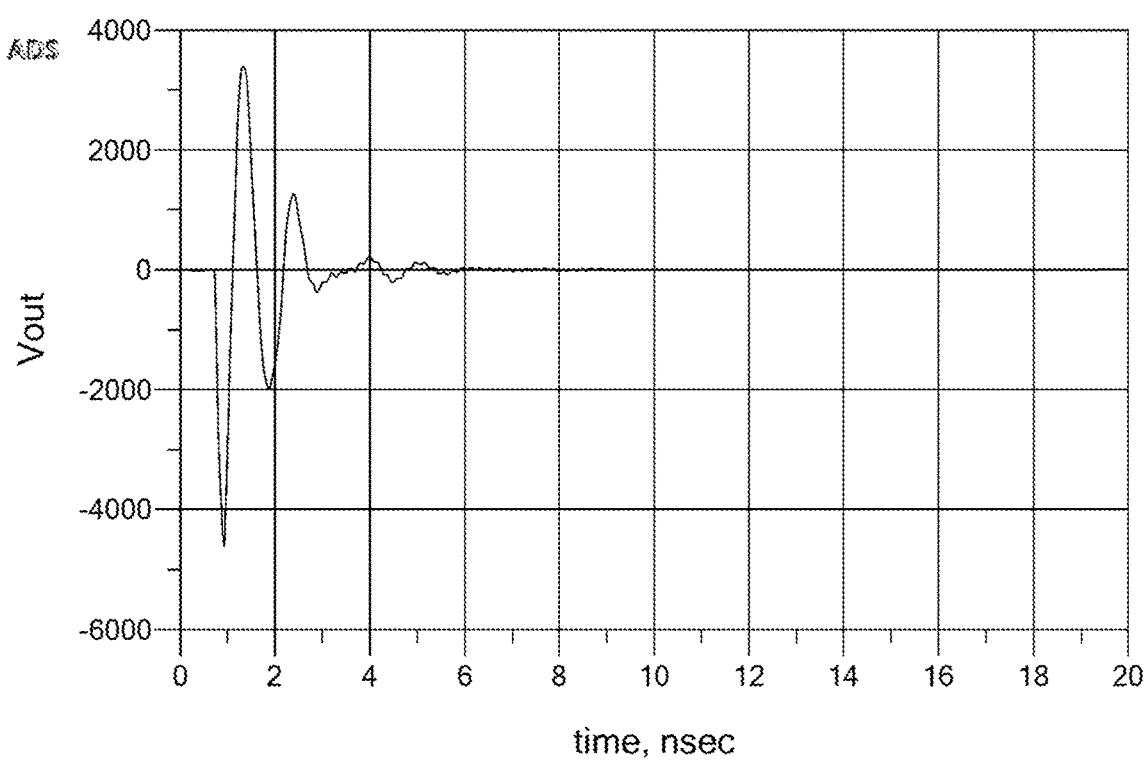
FIG. 3 is a graph of 1000 MHz modeling results for pulse vs. inductance at 40 pH inductance configured in accordance with an embodiment.

FIG. 3 is a graph 300 of 1000 MHz modeling results for pulse vs. inductance at 40 pH inductance.

Figure 4:
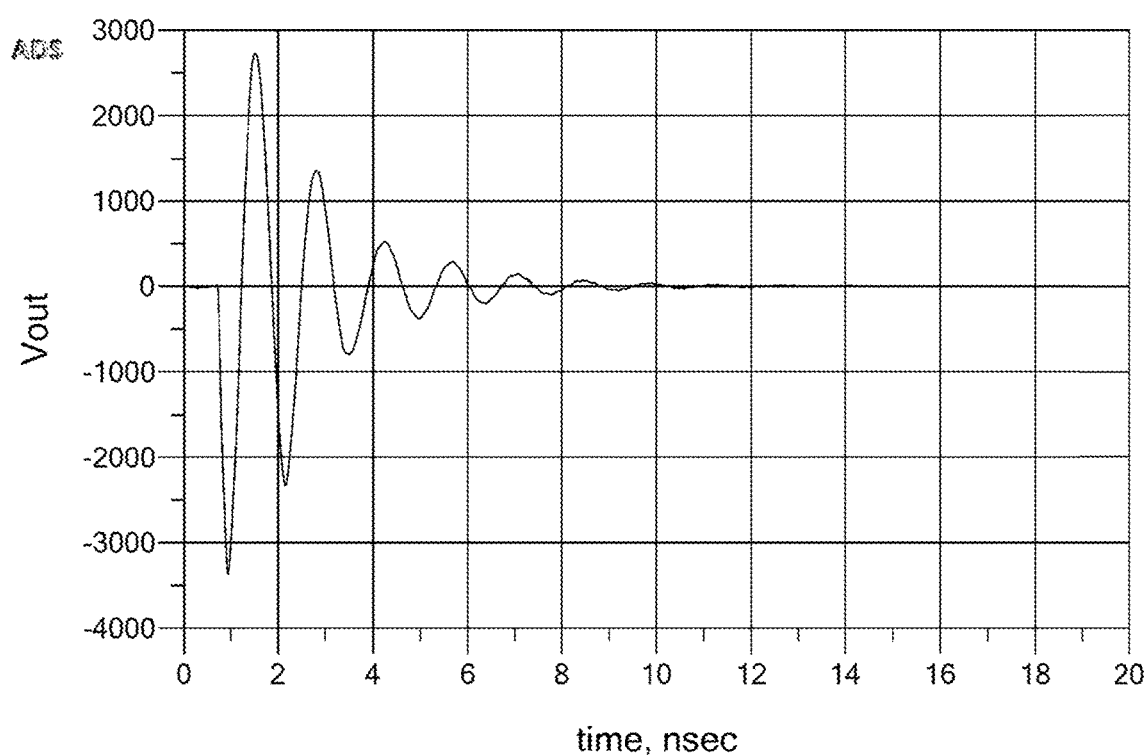
FIG. 4 is a graph of 1000 MHz modeling results for pulse vs. inductance at 80 pH inductance configured in accordance with an embodiment.

FIG. 4 is a graph 400 of 1000 MHz modeling results for pulse vs. inductance at 80 pH inductance.

Figure 5:
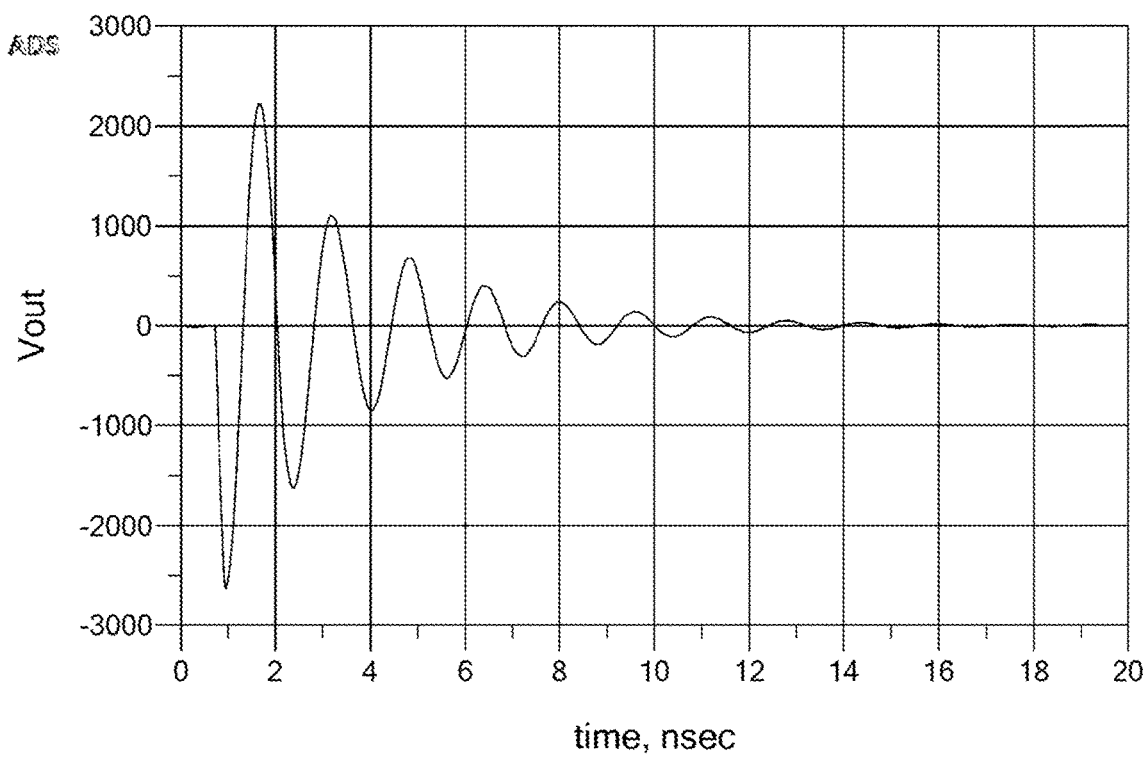
FIG. 5 is a graph of 1000 MHz modeling results for pulse vs. inductance at 120 pH inductance configured in accordance with an embodiment.

FIG. 5 is a graph 500 of 1000 MHz modeling results for pulse vs. inductance at 120 pH inductance.

Figure 6:
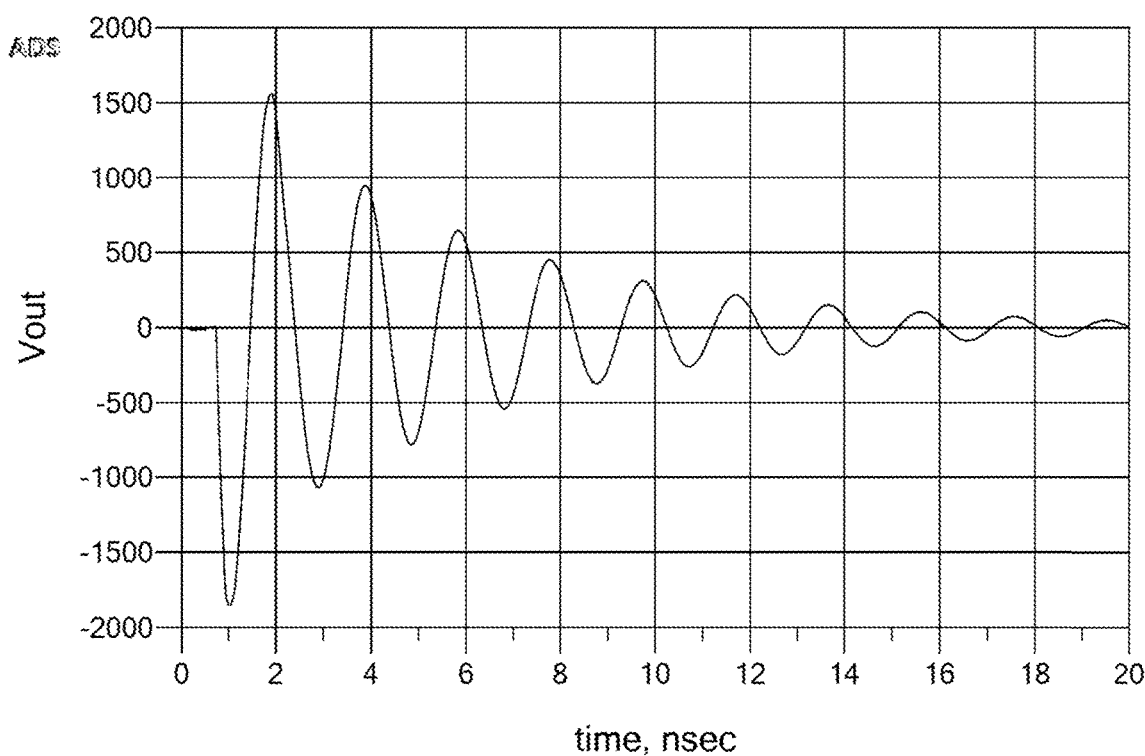
FIG. 6 is a graph of 1000 MHz modeling results for pulse vs. inductance at 200 pH inductance configured in accordance with an embodiment.

FIG. 6 is a graph 600 of 1000 MHz modeling results for pulse vs. inductance at 200 pH inductance.

Figure 7:
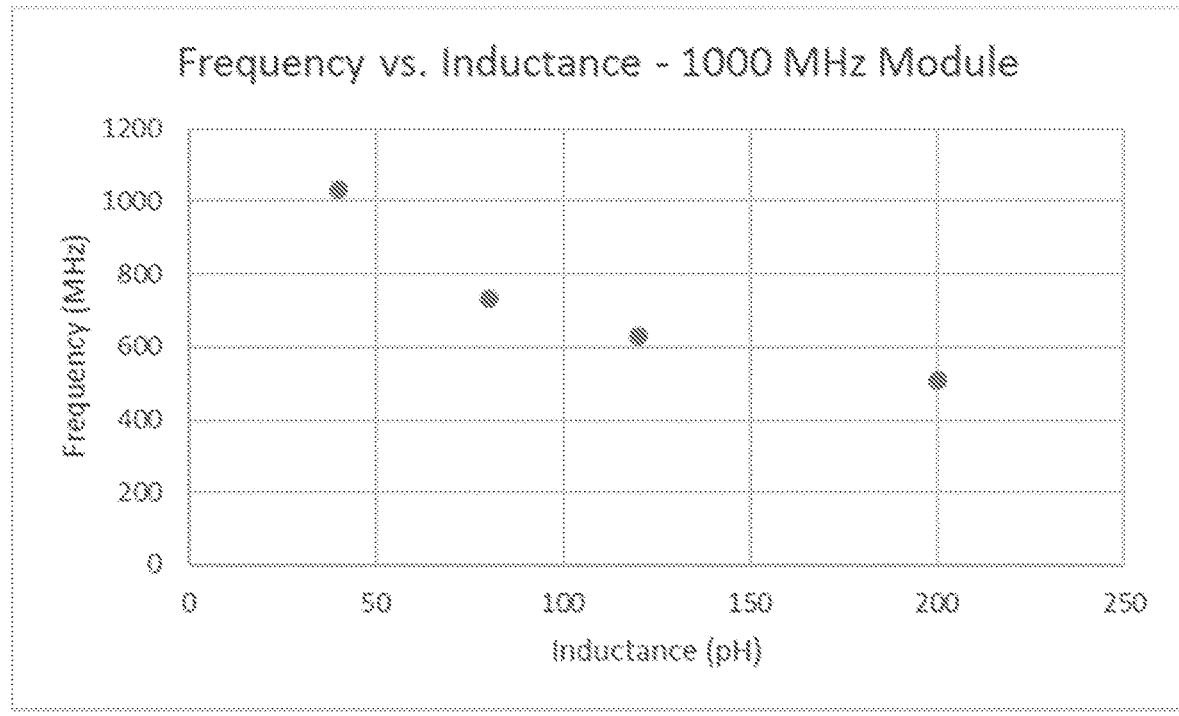
FIG. 7 is a graph of 1000 MHz modeling results for frequency vs. inductance configured in accordance with an embodiment.

FIG. 7 is a graph 700 of 1000 MHz modeling results for frequency vs. inductance 700. Data points include 1050 MHz at 40 pH, 725 MHz at 80 pH, 500 MHz at 120 pH, and 500 MHz at 200 pH.

Figure 8:
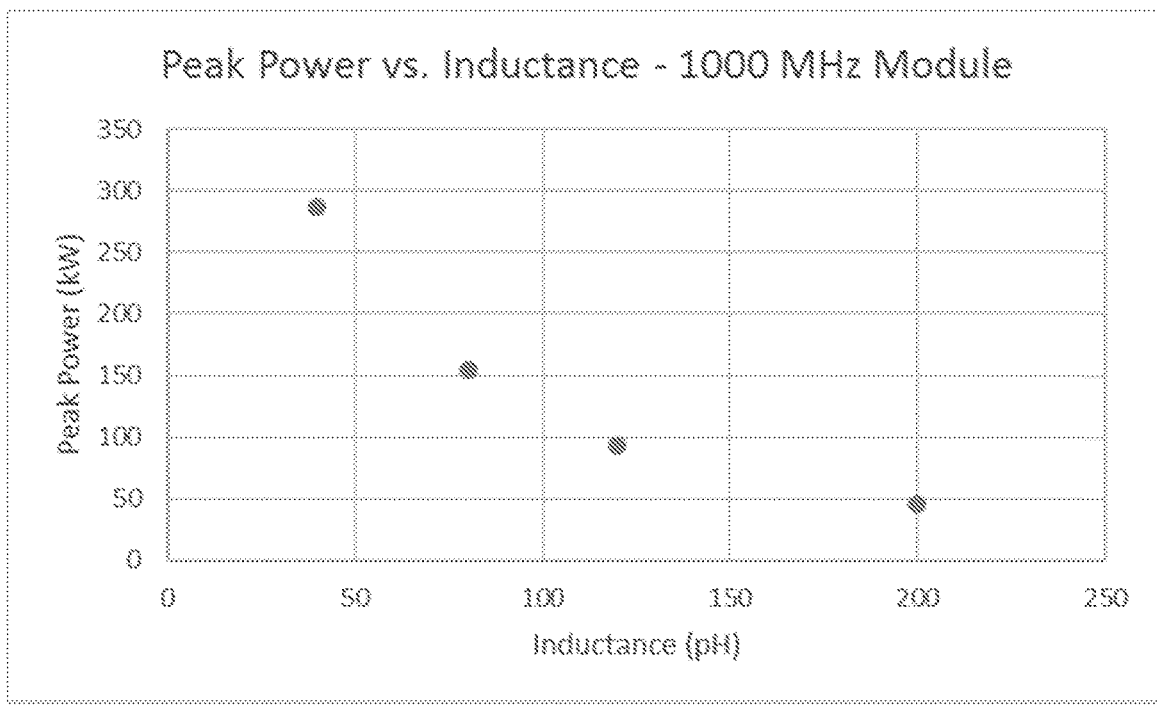
FIG. 8 is a graph of 1000 MHz modeling results for peak power vs. inductance at 40 pH inductance configured in accordance with an embodiment.

FIG. 8 is a graph 800 of 1000 MHz modeling results for peak power vs. inductance at 40 pH inductance. Data points include 290 Kw at 40 pH, 155 Kw at 80 pH, 95 Kw at 120 pH, and 48 Kw at 200 pH.

Figure 9:
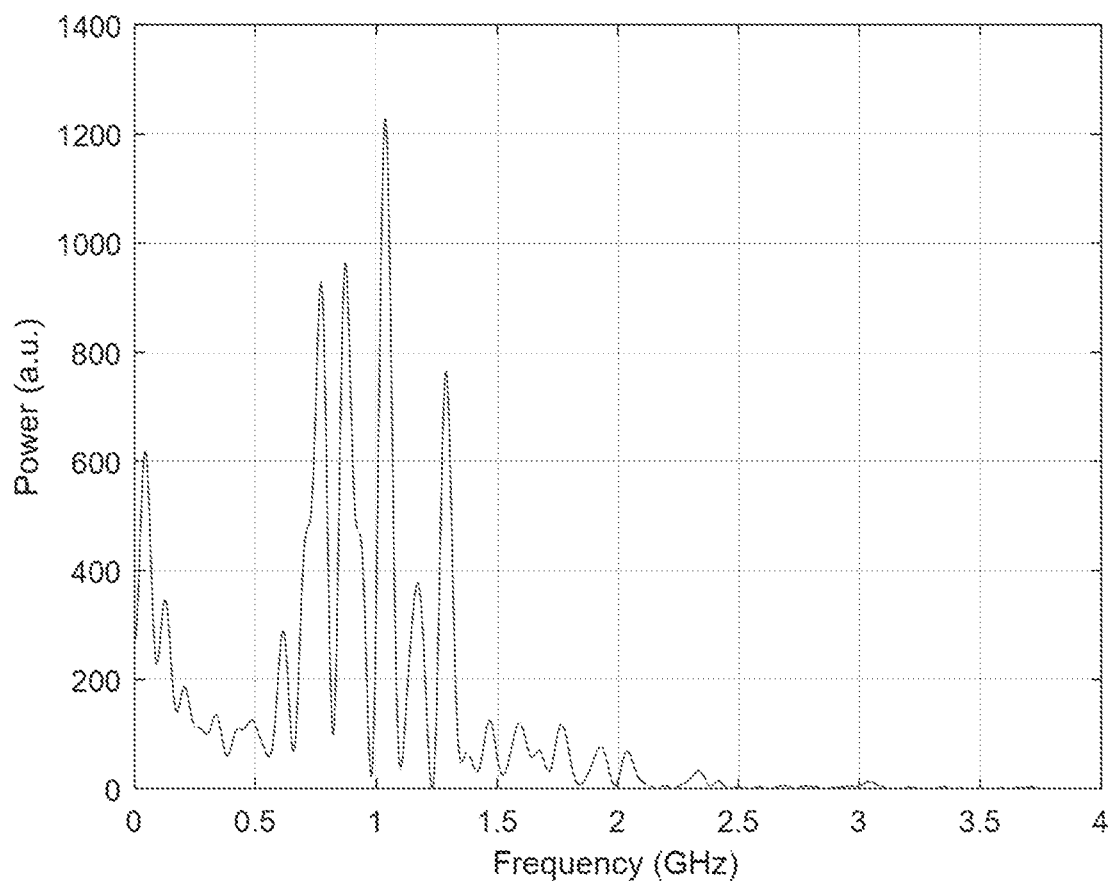
FIG. 9 is a graph of 1000 MHz measured results of frequency spectrum vs. induced parasitic inductance for ~1 GHz center of energy spectrum configured in accordance with an embodiment.

FIG. 9 is a graph 900 of 1000 MHz measured results of frequency spectrum vs. induced parasitic inductance for ~1 GHz center of energy spectrum 900.

Figure 10:
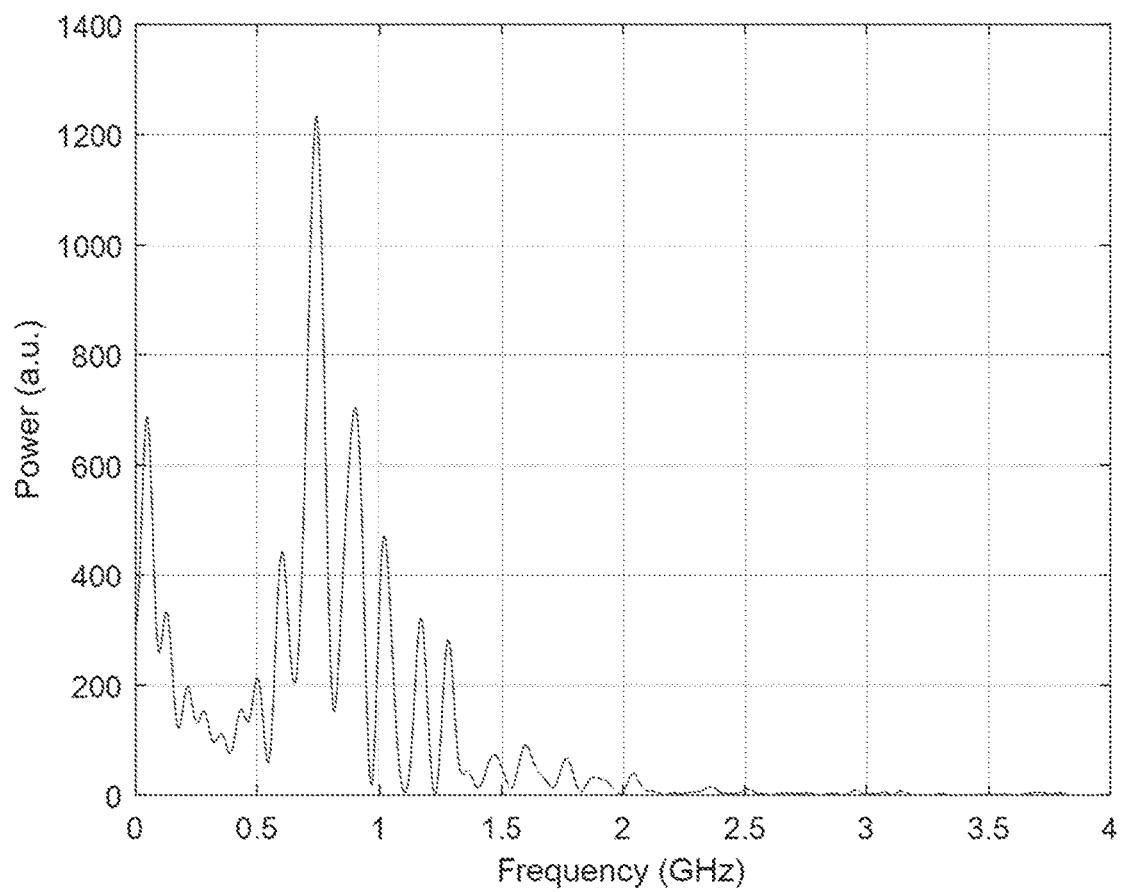
FIG. 10 is a graph of 1000 MHz measured results of frequency spectrum vs. induced parasitic inductance for ~0.8 GHz center of energy spectrum configured in accordance with an embodiment.

FIG. 10 is a graph 1000 of 1000 MHz measured results of frequency spectrum vs. induced parasitic inductance for ~0.8 GHz center of energy spectrum 1000.

Figure 11:
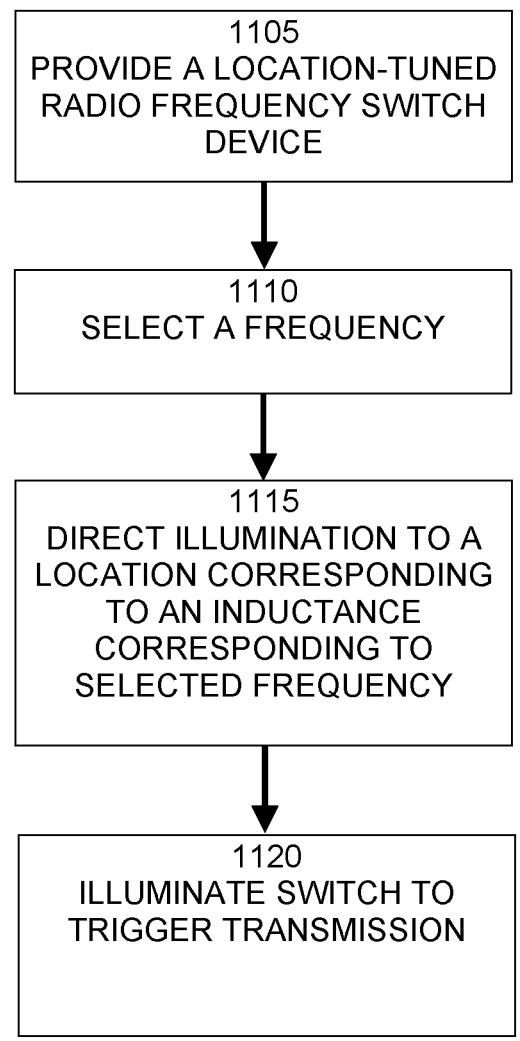
FIG. 11 is a flow chart of a method of frequency-tuning an RF switch configured in accordance with an embodiment.

FIG. 11 is flow chart 1100 for a method of frequency-tuning an RF switch. Embodiments comprise: providing a location-tuned radio frequency switch device 1105 comprising: transmission line; a photosensitive material switch component; and a light source having a varied illumination incidence location on said photosensitive material; whereby an inductance of said switch varies as a function of said incidence location of said illumination on said photosensitive material; selecting a frequency 1110; directing said illumination incidence location of said light source to a location corresponding to an inductance corresponding to said selected frequency 1115; and illuminating the switch to trigger transmission 1120.

The foregoing description of the embodiments has been presented for the purposes of illustration and description. It is not intended to be exhaustive or to limit the invention to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure. Other and various embodiments will be readily apparent to those skilled in the art, from this description, figures, and the claims that follow. It is intended that the scope of the invention be limited not by this detailed description, but rather by the claims appended hereto.

What is claimed is:

1. A location-tuned radio frequency switch device comprising:
    a transmission line;
    a photosensitive material switch;
    a connection between said transmission line and said photosensitive material switch electrically coupling said transmission line to said photosensitive material switch;
    a light source configured to emit a narrow beam incident on said photosensitive material switch, said light source having an illumination incidence location on said photosensitive material switch with respect to said transmission line; and
    an area of inductance comprising a cross-sectional area between said illumination incidence location on said photosensitive material switch and said transmission line;
    whereby an inductance of said location-tuned radio frequency switch device varies as a function of said illumination incidence location on said photosensitive material switch with respect to said transmission line and wherein said illumination incidence location is variable by moving at least one of said light source, said photosensitive material switch and said transmission line and correspondingly said area of inductance is variable.

2. The device of claim 1, wherein said device further comprises:
    a cradle supporting the transmission line and the photosensitive material switch.

3. The device of claim 1, wherein said location-tuned radio frequency switch is a high-power microwave switch.

4. The device of claim 1, wherein said photosensitive material switch comprises GaN.

5. The device of claim 1, wherein said photosensitive material switch comprises silicon.

6. The device of claim 1, wherein said area of inductance is delimited by varying said illumination incidence location on said photosensitive material switch.

7. The device of claim 1, wherein said area of inductance is delimited by varying a location of said light source providing said illumination incidence location on said photosensitive material switch.

8. The device of claim 1, wherein said area of inductance is delimited by varying at least one of a location of said transmission line and photosensitive material switch with respect to a fixed location of said light source providing said illumination incidence location on said photosensitive material switch.

9. The device of claim 1, wherein said area of inductance comprises a flexible integration between said photosensitive material switch and said transmission line.

10. The device of claim 1, wherein said transmission line comprises foil.

11. The device of claim 1, wherein said illumination incidence location varies continuously.

12. The device of claim 1, further comprising at least one mirror whereby said illumination incidence location is provided by a reflection from said light source off the at least one mirror.

13. The device of claim 1, further comprising at least one stepper motor configured to move said light source.

14. The device of claim 1, wherein said light source comprises a laser having a wavelength of about 1064 nm.

15. A method of frequency-tuning an RF switch comprising:
providing a location-tuned radio frequency switch device comprising:
a transmission line;
a photosensitive material switch component;
a connection between said transmission line and said photosensitive material switch component electrically coupling said transmission line to said photosensitive material switch component;
a light source having a varied illumination incidence location with respect to said transmission line; and
a variable area of inductance comprising a cross-sectional area between said illumination incidence location on said photosensitive material switch component and said transmission line;
whereby an inductance of said location-tuned radio frequency switch varies as a function of said illumination incidence location on said photosensitive material with respect to said transmission line by movement of at least one of said light source, said transmission line, and said photosensitive material switch;
selecting a frequency; and
directing said illumination incidence location of said light source to a location corresponding to said inductance corresponding to said selected frequency.

16. The method of claim 15, wherein said directing said illumination incidence location with respect to said transmission line comprises discrete incremental stops.

17. The method of claim 15, wherein said directing said illumination incidence location with respect to said transmission line comprises four discrete incremental stops.

18. The method of claim 15, wherein said directing said illumination incidence location with respect to said transmission line comprises four discrete incremental stops corresponding to inductance values of about 40 pH, about 80 pH, about 120 pH, and about 200 pH.

19. The method of claim 15, wherein said directing of said illumination incidence location comprises varying said illumination incidence location on said photosensitive material switch component.

20. A high-power microwave RF frequency tuning-in-silicon photoconductive-switch-based high power microwave system comprising:
a cradle;
a transmission line coupled to said cradle, wherein said transmission line is on a surface of said cradle;
a GaN switch coupled to said cradle, wherein said GaN switch is comprised of a photosensitive material;
a connection between said transmission line and said GaN switch electrically coupling said transmission line to said GaN switch;
a laser light source having a varied illumination incidence location on said photosensitive material;
a variable area of inductance comprising a cross-sectional area between said location of said illumination incidence on said photosensitive material switch component and said transmission line; and
a laser alignment component providing said location of said illumination incidence location on said photosensitive material;
whereby an inductance of said GaN switch varies as a function of said incidence location on said photosensitive material, and whereby said incidence location varies by moving at least one of said laser light source, said transmission line and said GaN switch.

* * * * *